United States Patent

Hüsges

[15] 3,655,316
[45] Apr. 11, 1972

[54] UNLOADING MECHANISM FOR SINGLE-LEVEL PLATEN PRESS

[72] Inventor: Walter Hüsges, Krefeld, Germany
[73] Assignee: G. Siempelkamp & Co., Krefeld, Germany
[22] Filed: Feb. 17, 1970
[21] Appl. No.: 11,972

[52] U.S. Cl............................425/161, 425/449, 425/436, 425/227, 100/218, 100/163, 156/574, 214/1 BT, 214/16.6
[51] Int. Cl.....................................B30b 15/32
[58] Field of Search..............214/1 BT, 16.4, 16.6; 100/218; 144/281; 18/4 P, 4 R, 2 RM, 16 R, 16 F, 16 P; 25/83, 1 D, 90, 102, DIG. 31, 120; 156/369, 375, 574, 576, 577

[56] References Cited

UNITED STATES PATENTS

| 1,959,512 | 5/1934 | Wall.......................................25/1 D |
| 3,179,262 | 4/1965 | Carlson..........................214/1 BSZ X |

*Primary Examiner*—Gerald M. Forlenza
*Assistant Examiner*—George F. Abraham
*Attorney*—Karl F. Ross

[57] ABSTRACT

A conveyor tray, insertable from one side between two press platens for the deposition of a pile of particulate material to be bonded under heat and pressure to form a board, is mounted on a horizontally slidable frame which also carries inwardly swingable suction arms for gripping a finished board and discharging it from the press at the opposite side while a new pile is delivered by the conveyor tray.

9 Claims, 4 Drawing Figures

FIG. I

WALTER HÜSGES
INVENTOR.

BY Karl F. Ross
ATTORNEY

WALTER HÜSGES
INVENTOR.

BY Karl G. Ross

ATTORNEY

3,655,316

UNLOADING MECHANISM FOR SINGLE-LEVEL PLATEN PRESS

FIELD OF THE INVENTION

My present invention relates to an unloading mechanism for a single-level platen press used to form coherent boards from piles of particulate material, e.g. cellulose fibers, generally by the concurrent application of heat and pressure to cure a thermosetting binder admixed with these particles. The resultant product, such as a sheet of the type known as fiberboard, is discharged from the press substantially concurrently with the introduction of a new pile of such particulate material.

BACKGROUND OF THE INVENTION

In many instances the freshly pressed board, resting on the lower press platen or bed, can be pushed out of the open press by the leading edge of the loading device introducing the next pile. This loading device may conveniently include a conveyor tray, e.g., as described in U.S. Pat. Nos. 3,050,200 and 3,077,271 to E. Siempelkamp, in which an endless belt carrying the pile (which may be precompacted to a generally rectangular cake) is inserted between the upper and lower platens and is then withdrawn while rotating at a rate corresponding to the speed of withdrawal to deposit the pile substantially without stress on the press bed. Such a discharge of the previously formed board by the advancing conveyor tray is, however, objectionable where the board has a finished undersurface, e.g. as produced by compression against a highly polished platen surface, which could be marred by a sliding across the press bed, particularly when the bonding agent is not yet fully cured. The danger of surface defects in the finished product increases with the working speed of the unloading means.

OBJECTS OF THE INVENTION

It is, therefore, the general object of my present invention to provide an improved unloading mechanism for a platen press which avoids the risk of a marred board surface even if the press is to be opened and closed at a rapid rate.

A related object is to provide means for discharging a hot and therefore still somewhat deformable board from the press with application of widely distributed stresses, thus avoiding the stress concentration resulting from the exertion of unloading pressure upon only one edge of the board.

SUMMARY OF THE INVENTION

These objects are realized, pursuant to my present invention, by the provision of gripping means insertable between the two platens in their open position to engage a freshly formed board, in combination with actuating means for withdrawing the gripping means together with the engaged board prior to reclosure of the platens, the actuating means being therefore synchronized with a lifting mechanism serving for the vertical reciprocation of one or both platens to effect their relative motion of opening and closure.

According to a more specific feature of my invention, the board-gripping elements take the form of a plurality of suction heads supported for both horizontal and vertical motion, the horizontal motion into the working space of the press being preferably accompanied by a swing across opposite platen edges. For this purpose the suction heads are advantageously mounted on two sets of arms pivotally secured to a pair of stringers which bracket the platens and are horizontally slidable therealong to entrain the engaged board after it has been lifted off the press bed. For the vertical movement required to lower the suction heads onto the board and thereupon lifting the latter, means are provided for raising and lowering these arms either jointly with the stringers or relatively thereto. In the latter instance the stringers may be hollow to form ducts for the supply of a pressure fluid to all the arms in parallel, thereby simultaneously elevating and depressing them.

According to another advantageous feature of my invention, the stringers carrying the swingable arms with their suction heads are mechanically connected with the feed means (e.g. a conveyor tray) serving to load the press whereby the discharge of a finished board is automatically synchronized with the introduction of a fresh pile. Thus, the stringers may form part of a generally rectangular frame surrounding the platens, one side of the frame being constituted by one or more roller shafts of a conveyor belt.

DESCRIPTION OF THE DRAWING

The invention will be described hereinafter in greater detail with reference to the accompanying drawing in which:

FIG. 4 is an enlarged detail view.

SPECIFIC DESCRIPTION

Figure 1:
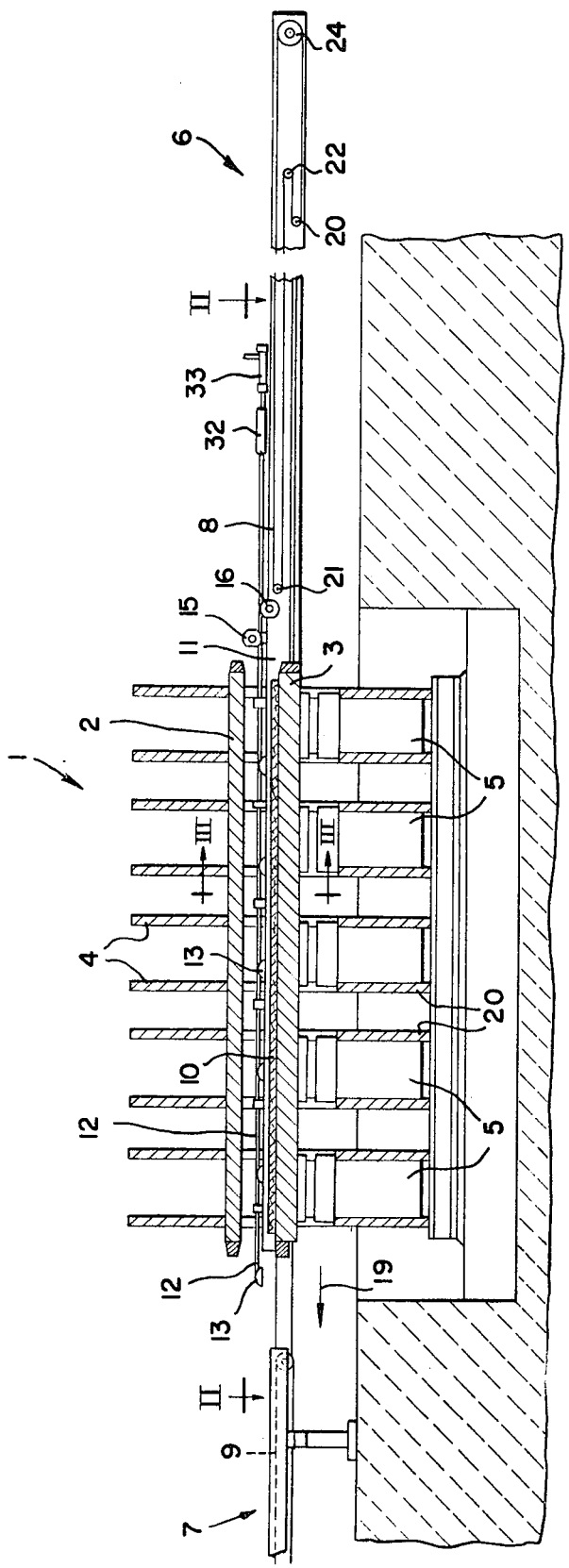
FIG. 1 is a sectional elevational view of part of a platen press equipped with loading and unloading means according to the invention.

The press 1 shown in the drawing has a pair of heated platens 2 and 3 which are provided with highly polished (e.g. chromium-plated) working surfaces 17, 18 confronting each other. The upper platen 2 is fixedly suspended from webs 4 in the top portion of the press frame, not further illustrated, whereas the lower platen or bed 3 is vertically movable with the aid of hydraulic or pneumatic pistons 5 guided in cylinders 20.

In the illustrated open position, platen 3 is lowered to the level of a loading station 6 and an unloading station 7 positioned on opposite sides of the press 1. Loading station 6 comprises a conveyor tray formed by an endless belt 8 which passes around rollers 21, 22, 23 and 24 whose shafts are journaled in a pair of parallel stringers 11, 11', these stringers being interconnected by a cross-piece 14 to form a frame which surrounds the press and is horizontally movable in the direction of an arrow 19, i.e. to the left as viewed in FIGS. 1 and 2. Roller 24 is intermittently driven, by a non-illustrated motor, in step with the horizontal displacement of stringers 11 and 11' which are reciprocated by a conventional driving mechanism not shown, it being understood that the advance in the direction of arrow 19 takes place in the open press position with stationary conveyor 8 which is subsequently set in motion upon the return movement of the stringer frame. This operation deposits a pile of, say, cellulosic fibers and thermosetting resin upon the bed 3 for subsequent compression into a board 10 with finished surfaces produced by the layers 17 and 18. Naturally, the supply of operating fluid to the lifting cylinders 20 is so timed that the press closes only after the withdrawal of conveyor 8 from its working space.

Figure 2:
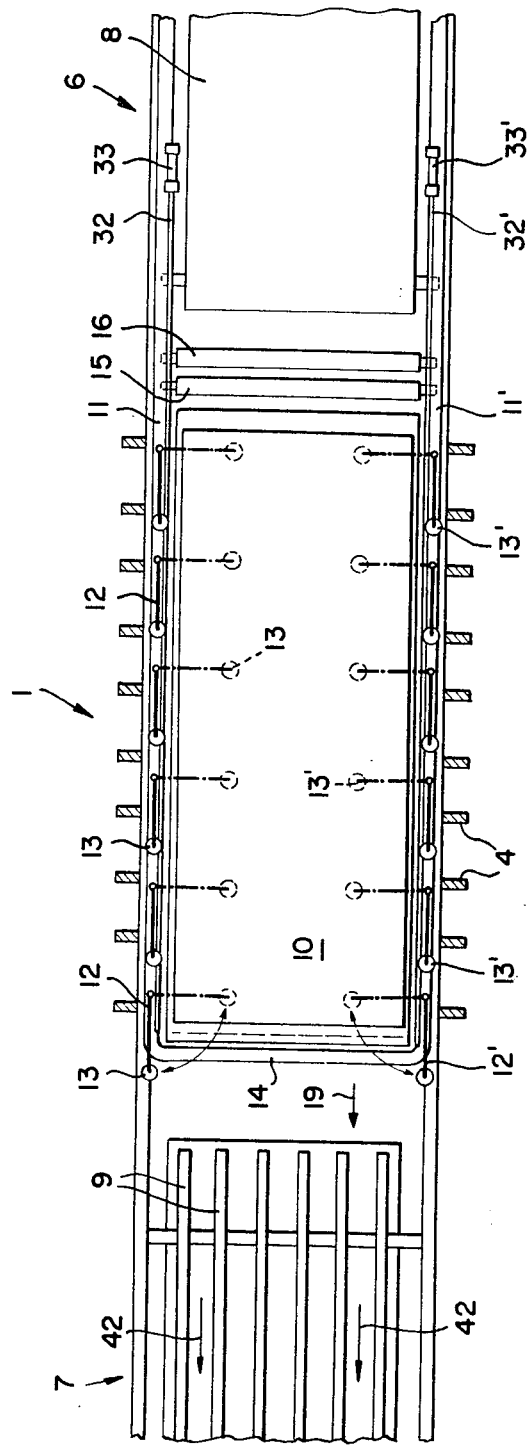
FIG. 2 is a top plan view of the significant elements of the system embodying the invention, taken on the line II—II of FIG. 1.
Figure 3:
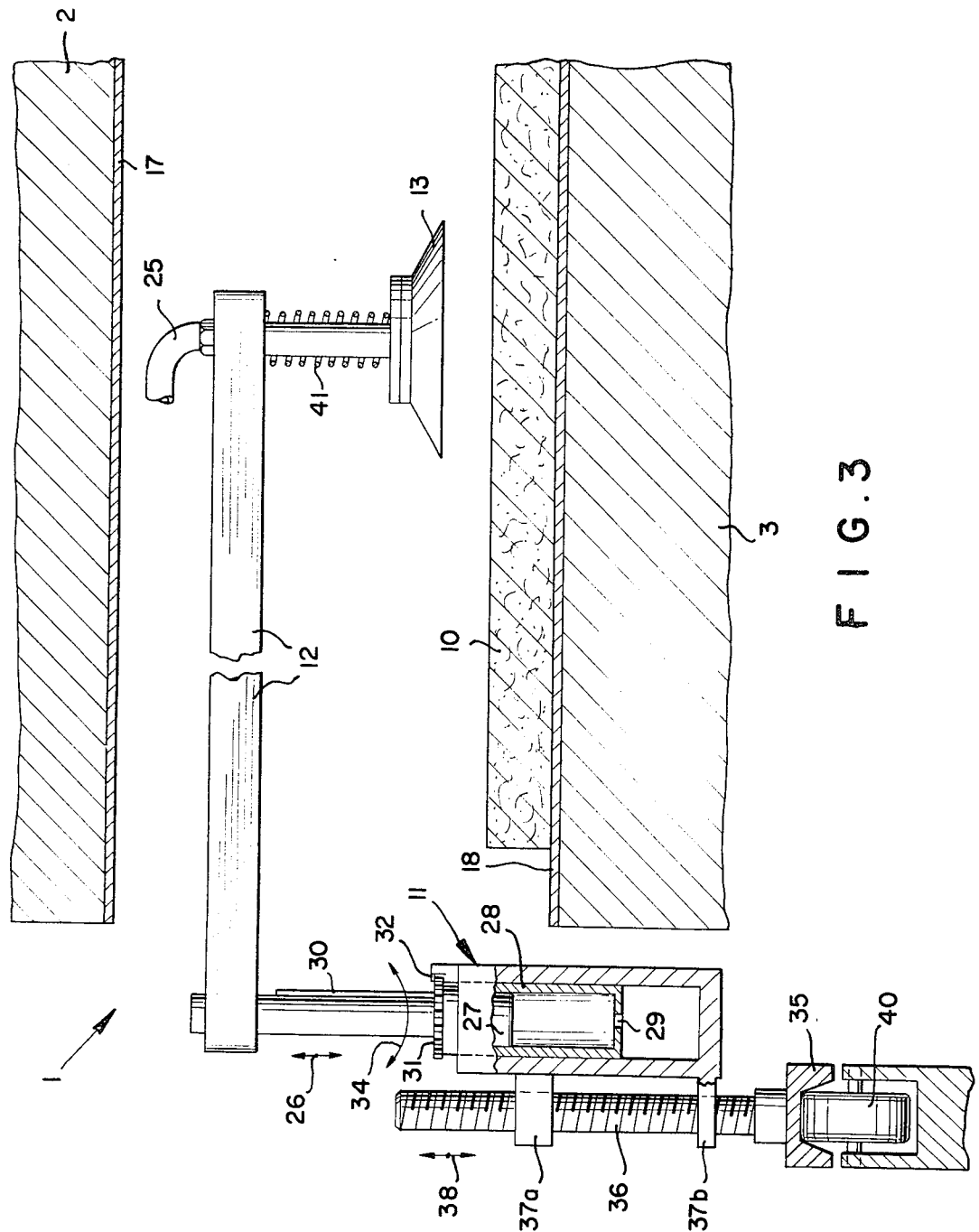
FIG. 3 is a fragmentary cross-sectional view taken on the line III—III of FIG. 1 but drawn to a larger scale.

In accordance with my present invention, the two stringers 11, 11' carry respective sets of arms 12, 12' which terminate in suction heads or cups 13, 13'. As best seen in FIG. 3, each of these suction heads has a certain vertical mobility on its supporting arm 12 and is provided with a tube 25 leading to a source of vacuum not shown. With the arms swung inwardly above the board 10, in the bottom position of platen 3, these arms together with their suction heads can be lowered so that the cups grip the board at widely distributed points as illustrated in dot-dash lines in FIG. 2.

The vertical reciprocation of the gripping means 12, 13 and 12', 13', indicated in FIG. 3 by an arrow 26, is carried out with the aid of pistons 27 received in cylinders 28 within the hollow stringers 11, 11'. Each cylinder 28 communicates through an orifice 29 with the interior of the stringer to which pressure fluid is applied in the proper thickness, e.g. from the source feeding the press cylinders 20. Piston 27 and cylinder 28, held against relative rotation by a key 30, are jointly rotatable within stringer 11, as indicated by an arrow 34, under the control of a mechanism here shown to comprise a pinion 31 rigid with each piston, a rack 32 in mesh with all the pinions 31 on stringer 11 (a similar rack 32' being slidably mounted on stringer 11' to drive the pinions associated with arms 12'), and a pair of hydraulic jacks 33, 33' (FIGS. 2 and 4) controlling the shifting of the racks. In addition, the stringers 11, 11' may be vertically adjusted, together with their gripping assemblies 12, 13 and 12', 13', by being supported on respective rails 35 through the intermediary of two or more parallel spindles 36 which pass through nuts 37a, 37b and are rotatable, manually or otherwise, to vary the level of the stringers according to the thickness of board 10 as indicated by an arrow 38. The rail 35, in turn, rest on rollers 40 to facilitate the aforedescribed horizontal displacement of the frame constituted by stringers 11, 11', cross-piece 14 and feed means 8, 21-24. Naturally, the conveyor rollers 21-24 could be supported directly on the rails 35, rather than on the elevatable stringers 11, 11', if no vertical adjustment of the conveyor tray is desired.

Cylindrical wipers 15, 16 span the stringers 11, 11' to sweep the surfaces 17, 18 of the separated platens 2, 3 between press closures.

A complete operating cycle of the system according to my invention is therefore as follows:

With the platens 2 and 3 spaced apart as shown in FIGS. 1 and 3, racks 32 and 32' are shifted to swing the arms 12, 12' inwardly on a level in which the suction cups 13, 13' are raised above the freshly pressed board 10, the cylinders 28 being filled at this instant with pressure fluid admitted to the interior of stringers 11 and 11'. Shortly thereafter, the cylinders 28 are drained or vented so that the arms 12, 12' descend until the cups 13, 13' come to rest upon the board surface, the impact being softened by coil springs 41 bearing upon these cups. At this point, or slightly before, suction is applied to vacuum lines 25 so that the cups grip the board and entrain it upwardly upon the subsequent readmission of pressure fluid to the stringers 11 and 11'. With the racks 32, 32' remaining in their previous position relative to the stringers, the loading and unloading assembly is now advanced in the direction of arrow 19 to remove the board 10 from the press space and to introduce a new pile into that space. Next, the cylinders 28 are again emptied of fluid so that the arms 12 and 12' are lowered to deposit the entrained board on a set of conveyor bands 9 forming part of the unloading station 7 whereupon, as indicated by arrows 42, the board is transported to a further destination; the application of suction to the cups 13, 13' through vacuum lines 25 is, of course, terminated at the same time. The racks 32 and 32' are now shifted back to their original position relative to stringers 11, 11' whereby, just prior to the return movement of the stringers (to the right in FIGS. 1 and 2), the arms 12 and 12' are restored to a position parallel to the major edges of the rectangular platens as illustrated in full lines in FIG. 2. With the return motion of the stringer frame, conveyor 8 is driven to deposit the new pile on the bed 3. Upon the completion of this step, and with the belt 8 clear of the platens, the press closes to form a new board. The foregoing sequence of operations is executed with the aid of a conventional timer, valves and switches not shown.

I claim:

1. In a platen press having an upper platen and a lower platen means provided with a lifting device for relatively displacing same between an open position and a closed position to compress a pile of particulate material into a coherent board, the combination therewith of a device operable to deposit a pile of such material upon said lower platen in said open position, a gripping device insertable between said platens in said open position to engage a freshly formed board, and an actuating device for said gripping means synchronized with said lifting device for withdrawing said gripping device together with the engaged board prior to return of said platens to said closed position, said gripping device comprising a plurality of suction heads and a support means, both said means being relatively movable horizontally and vertically for engaging said suction heads with the board, removing the board from the lower platen means and extracting the board from between the platens, said support means comprising a pair of horizontally slidable stringers bracketing said platens and two sets of arms swingably mounted on said stringers for pivotal movement toward and away from each other.

2. In a platen press having an upper platen and a lower platen provided with lifting means for relatively displacing same between an open position and a closed position to compress a pile of particulate material into a coherent board, the combination therewith of feed means operable to deposit a pile of such material upon said lower platen in said open position, gripping means insertable between said platens in said open position to engage a freshly formed board, and actuating means for said gripping means synchronized with said lifting means for withdrawing said gripping means together with the engaged board prior to return of said platens to said closed position, said gripping means comprising a plurality of suction heads and support means movable horizontally and vertically for lowering said suction heads upon the boards, raising the board from the lower platen and extracting the board from between said platens, said support means comprising a pair of horizontally slidable stringers bracketing said platens and two sets of arms swingably mounted on said stringers for pivotal movement toward and away from each other.

3. The combination defined in claim 2 wherein said feed means is mechanically coupled with said stringers for introducing a pile into the open press from one side while extracting a freshly formed board from the opposite side.

4. The combination defined in claim 3 wherein said feed means comprises a conveyor tray mounted between said stringers.

5. The combination defined in claim 2, further comprising wiper means spanning said stringers for sweeping said platens upon extraction of a board.

6. The combination defined in claim 2 wherein said stringers are provided with positioning means for raising and lowering said arms with reference to said stringers upon retraction of said suction cups from between said platens.

7. The combination defined in claim 6 wherein said positioning means comprises a source of fluid pressure connected to all said arms in parallel.

8. The combination defined in claim 4 wherein said stringers are part of a generally rectangular frame surrounding said platens.

9. The combination defined in claim 1, further comprising conveyor means positioned adjacent said platens for receiving a board from said gripping means and removing said board from the press.

* * * * *